United States Patent
Yong et al.

(10) Patent No.: US 11,148,062 B2
(45) Date of Patent: Oct. 19, 2021

(54) SCENE TAGGING

(71) Applicant: Sony Interactive Entertainment LLC, San Mateo, CA (US)

(72) Inventors: Stephen Yong, San Francisco, CA (US); Hu Peng, Orinda, CA (US); Khoi-Nguyen Duc Do, San Francisco, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 7 days.

(21) Appl. No.: 15/984,058

(22) Filed: May 18, 2018

(65) Prior Publication Data
US 2019/0351335 A1    Nov. 21, 2019

(51) Int. Cl.
*A63F 13/86* (2014.01)
*A63F 13/52* (2014.01)
*A63F 13/53* (2014.01)

(52) U.S. Cl.
CPC .............. *A63F 13/86* (2014.09); *A63F 13/52* (2014.09); *A63F 13/53* (2014.09)

(58) Field of Classification Search
CPC ........... A63F 13/86; A63F 13/52; A63F 13/53
See application file for complete search history.

(56) References Cited

U.S. PATENT DOCUMENTS

| | | | |
|---|---|---|---|
| 2004/0225386 A1* | 11/2004 | Thompson | A63F 13/12 700/92 |
| 2010/0260487 A1* | 10/2010 | Zbeda | A63F 13/497 386/239 |
| 2014/0187318 A1* | 7/2014 | Gallizzi | A63F 13/355 463/31 |
| 2017/0001122 A1* | 1/2017 | Leung | A63F 13/86 |
| 2017/0097978 A1* | 4/2017 | Gupta | G06F 16/285 |

(Continued)

OTHER PUBLICATIONS

Let's Analyze Some Replays—Starcraft 2 Ladder Published by davidangel64 Feb. 9, 2018 https://www.youtube.com/watch?v=YpCkVONyzzs (Year: 2018).*

(Continued)

*Primary Examiner* — Tramar Harper
*Assistant Examiner* — Jeffrey K Wong
(74) *Attorney, Agent, or Firm* — Polsinelli LLP (57) ABSTRACT

The present disclosure describes methods and systems directed towards implementing scene tagging. In particular, scene tagging is used to characterize user generated content associated with gameplay information associated with video games. Exemplary user generated content include video recordings or screenshots from within the video game that pertain to events that have occurred. Corresponding metadata would then be used to describe substantive aspects about the user-generated content such as details about where the recording or screenshot was taken, who was included in the user-generated content, and what objects are found in the user-generated content. The associated metadata would 1) allow users to search among various uploaded user generated content and 2) search within portions of those use-generated content for particular sub-sections of interest. Furthermore, the metadata associated with the user-generated content would allow viewers to experience the same events that were recorded.

21 Claims, 3 Drawing Sheets

(56) References Cited

U.S. PATENT DOCUMENTS

2017/0340972 A1* 11/2017 Seo .................... A63F 13/5375
2018/0221769 A1* 8/2018 Kosai .................... G06F 17/18

OTHER PUBLICATIONS

Insane challenge #2: Pro player 1 vs 2 diamond players!?—Starcraft 2 Published by BeastyqtSC2 Apr. 23, 2017 https://www.youtube.com/watch?v=p9VrOYIsFTQ (Year: 2017).*
How to Watch Starcraft 2 Replay https://www.youtube.com/watch?v=kOCNFMbKWGY Uploaded by honeyroastedmint Sep. 10, 2010 (Year: 2010).*

* cited by examiner

SCENE TAGGING

BACKGROUND

Field of Invention

The present invention generally relates to user generated content. More specifically, the present invention relates to automated scene-tagging of user generated content.

Description of the Related Art

User-generated content is any form of content created by users of a system or service and made available publicly on that system. Exemplary user generate content can be found on online platforms such as social media sites and may include content such as blogs, videos, and commentary. The genre of user generated content can range from problem processing, news, entertainment, advertising, gossip, and research. With the improvement in media production and technology as well as user friendly and affordable methods to facilitate in content generation, the general public has been able to create and share content in greater amounts than in the past. Currently there are little to no "gatekeepers" or filters for the user generated content available publicly.

With the vast variety of user generated content, many of them may pertain to topics that are not relevant or interesting to users. Without viewing the content directly, users may not know whether they would enjoy consuming the content as opposed to other content. There is a need to characterize the user generated content and provide specific content to users based on their personal interests.

Furthermore, since a lot of user generated content is created on a daily basis, there may be a lot of overlap among popular content. Content on the same genre or topic may be made publicly available. Although similar content being created would provide more exposure to a genre or topic, the overabundance of similar content would spread the exposure across a number of different pieces of content making no one particular piece stand out. There is a need to consolidate similar content uploads so as to remove redundancies and promote particular user generated content.

Lastly, user generated content is able to provide a view of other user experiences, for example, within a video game. It is a challenge, then, to replicate that experience for the user who would also want to participate in that same experience shown in the uploaded user generated content. There is a need to facilitate user experiences associated with the content that was just viewed.

SUMMARY OF THE CLAIMED INVENTION

Embodiments of the present invention include a method for implementing and using scene tagging. The method includes generating user content associated with a video game. The user generated content includes a recording of an event that occurred within the video game being played on a user computing device. The user generated content is then characterized so that details about the recorded event can be obtained. Details about the recorded event include where the recorded event occurred within the video game. Afterwards, metadata is automatically generated and assigned to the user generated content that is used to describe features of the recorded event. The user generated content and associated metadata can then be stored in a database. Users can provide requests to view user generated content by providing requests that have terms that correspond to the assigned metadata. The user computing devices can then display the user generated content on the user computing device to view. Furthermore, the user generated content can be used to recreate the recorded event so that the user can participate within the same event on the user computing device.

Embodiments of the present invention include a system for implementing and using scene tagging. The system includes a first party platform that generates user content associated with a video game. The user generated content includes a recording of an event that occurred within the video game being played. The first party platform then characterizes details about the recorded event that includes a location of where the recorded event occurred within the video game. Afterwards, metadata is assigned to the user generated content that is used to describe features of the recorded event. The user generated content and the assigned metadata is then stored in a database. Users can then transmit requests to the first party platform to user generated content stored therein. The user generated content is retrieved and displayed on the user computing devices for viewing. Furthermore, the user generated content and the metadata can be used to recreate the recorded event so that the user can participate within the same event on their user computing device.

DETAILED DESCRIPTION

The present disclosure describes methods and systems directed towards implementing scene tagging. In particular, scene tagging is used to characterize user generated content associated with gameplay information associated with video games. Exemplary user generated content include video recordings or screenshots from within the video game that pertain to events that have occurred. Corresponding metadata would then be used to describe substantive aspects about the user-generated content such as details about where the recording or screenshot was taken, who was included in the user-generated content, and what objects are found in the user-generated content. The associated metadata would 1) allow users to search among various uploaded user generated content and 2) search within portions of those use-generated content for particular sub-sections of interest. Furthermore, the metadata associated with the user-generated content would allow viewers to experience the same events that were recorded.

As described herein, user generated content corresponds to content that is created and make publicly available for others to view. The user generated content corresponds to, for example, a video game that the content created participated in and recorded an event that occurred during course of gameplay. The recorded gameplay information can be uploaded onto social media sites and made publicly available for others to view.

With the user generated content, metadata can be generated and associated with the user-generated content. The metadata associated with the user generated content can be used in a number of different ways. For example, the metadata would also allow services to direct (e.g. recommend, promote) certain popular user generated content for a single or group of users to view based on a user profile or preference. For example, if a particular user would like to view user generated content of a particular genre or by a particular author, the users can be provided publicly available content that satisfies this preference. This allows users to avoid having to filter through content that does not pertain to the user's interest.

Furthermore, if multiple user generated contents share similar metadata, such as pertaining to the same event, the metadata can be used to consolidate these separate entries. For example, the user generated content associated with the same event may be modified to all be referred to the same way. Another embodiment would allow the first author to post user generated content of a particular event and prevent subsequent authors from posting similar events in the future. Alternatively subsequent similar events may be referenced by the first user generated content.

Furthermore, metadata would also allow the user to search within the user generated content for specific portions of interest. For example, if the user is interested in a particular event that occurred, metadata may be assigned to that event that allows users to skip to that portion of the user generated content instead of having to view the entirety of the user generated content.

Lastly, the metadata would allow viewers to experience the event(s) associated with the user generated content. In the embodiment of video games, this would allow viewers who also have the same video game to download and execute related instructions for establishing the same environment and event(s) recorded in the user generated content. If the user generated content pertains to a particular event within the video game, viewers would be able to also experience that same event first hand instead of merely viewing what the author did.

Figure 1:
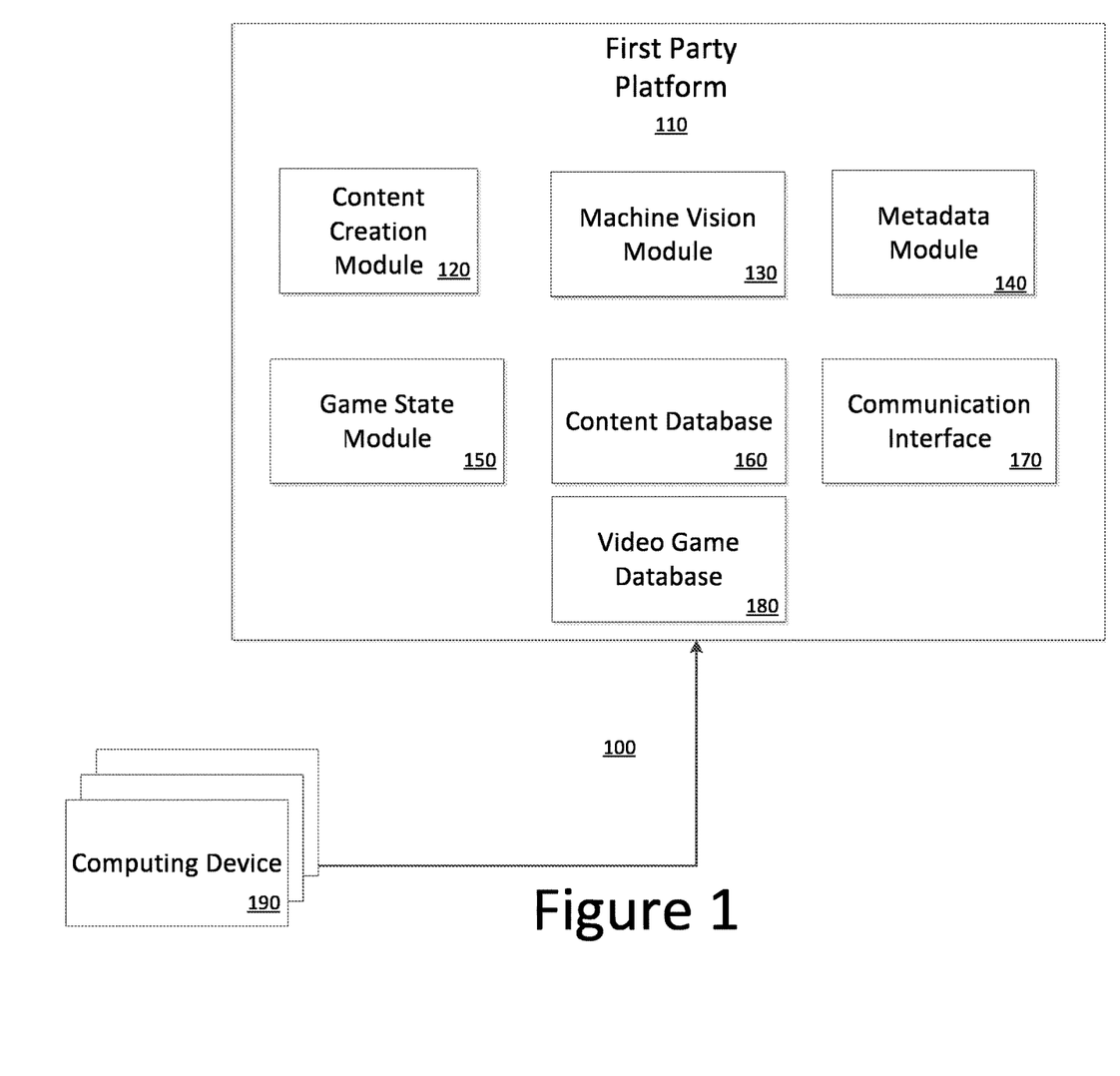
FIG. 1 illustrates a system for scene tagging.

FIG. 1 illustrates a system 100 for scene tagging. The system 100 would process the user generated content, generate and associate corresponding metadata, and manage/organize a database for the user generated content. Furthermore, the system 100 would facilitate in replicating the experience within the user generated content for viewers on their respective computing devices based on user generated content.

The system 100 includes a first party platform 110 that is in communication (using communication interface 170) with each computing device 190 (e.g. gaming console) that is compatible with the first party platform. The first party platform 110 may be a network associated with a particular gaming network in which users can connect to and play various video games on their computing device 180. The first party platform 110 may store information regarding each video game in a video game database 180 from which users can access and download onto their respective computing device 190. The information would allow the execution and play of video games in connection with the first party platform 110.

Aside from playing video games on their computing devices 180, the first party platform 110 also allows users to generate, modify, and store user generated content in a content database 160. The first party platform 110 includes a content creation module 120 that allows users to create user generated content, machine vision module 130 that is used to characterize the user generated content, and metadata module 140 that generates and associates metadata with the user generated content. The first party platform 110 also includes game state module 150 that allows viewers to re-live events within the user generated content. Further details regarding each of the features of the first party platform 110 will be provided below.

Although the present disclosure will generally describe that the features of scene tagging is performed with respect to the first party platform 110, in other embodiments some of the features may be perform by other computing devices (e.g. servers) associated with the first party platform 110. This would allow the first party platform 110 to share responsibilities with other resources and share the workload/burden in carrying out the scene tagging described herein.

As described herein, the first party platform 110 may coincide with a gaming network compatible with a plurality of different video games. The first party platform 110 may include video game assets stored in the video game database 180 that facilitate the initiation, running, and management of video games on the gaming network. For example, the first party platform 110 would facilitate a plurality of users in participating in the same video game in a multi-player experience via instances that are run on the gaming network (e.g. on the Internet/cloud). The first party platform 110 may also be used to track gameplay statistics (e.g. win/loss) and can also be used for match-making purposes. User computing devices 190 (e.g. gaming consoles) of the system 100 would be communicatively connected to the first party platform 110 (and the gaming network) using a variety of different communication interface features 170.

The first party platform 110 includes a content creation module 120. The content creation module 120 facilitates each user in creating their user generated content. The content creation module 120 may include features that facilitate taking a screen shot, recording audio, and/or recording video within the video game. For example, while an event occurs within the video game, the user may instruct the first party platform 110 (via their computing device 190) that the user would like to start audio and video recording the current gameplay. The first party platform may begin recording as instructed and continue recording for a pre-set amount of time or until the user indicates that recording should stop.

Once recording has been completed, the creation module 120 may generate a unique label that includes information such as the name of the video game, the author of the user generated content, and a time stamp. The user generated content may then be stored in the content database 160, on the user computing device 190, or any other storage place associated with the first party platform 110 or the user computing device 190.

The machine vision module 130 of the first party platform 110 is used to analyze, (for example, from a screenshot or video recording) what the user generated content is about. For example, the machine vision module 130 could identify objects, locations, and characters that appear within the user generated content associated with video game. The machine vision module 130 is able to make the identification by using known machine vision functions to compare images of the objects, locations, and characters that appear within the user generated content with game assets stored in the video game database 180. There may be different video game databases 180 specific to each different video game that contains assets usable to identify the objects, locations, and characters.

The machine vision module 130 may also be capable of obtaining information about the current game state of the video game (from the game state module) in order to identify objects, locations, and characters. This may be useful in situations where there may be objects, locations, and characters that are similar to each other. The game state information can be used to differentiate between the similarities.

For example, two objects may have similar visual aesthetics but different in-game statistics. The game state information (from the game state module 150) would provide the related in-game statistics about the similar objects from which the machine vision module 130 can further use to identify the particular object.

Furthermore, with the game state information, the machine vision module 130 would be able to identify if different recordings relate to the same area but have different point of view/perspective. In this way, user generated content about the same object, location, event, or character can be identified. Similar user generated content may be consolidated (e.g. all user generated content about a particular location is referenced in the same manner and stored together). If a user queries for the event, the user may be provided all the relevant user generated content that pertains to the event. Alternatively, it may be possible to allow the different user generated content and after a pre-determined amount of time (e.g. a week), remove all user generated content except for the most popular or highest rated version. Another embodiment may allow a first user generated content about a particular subject matter to be uploaded and stored but any subsequent user generated content about the same subject matter may not be allowed to be stored unless the first uploaded and stored user generated content is rated poorly or is unpopular for a period of time.

The metadata module 140 generates metadata that can be associated with the user generated content. The metadata data, in a way, automatically generates tags that can be used to identify what is currently happening in the user generated content. The generated metadata can be used to identify particular objects, environments, characters, and events associated with the user generated content. The metadata can also be used to describe the underlying gameplay data associated with the generated content.

It may also be possible to provide user interface features so that users can provide additional information and commentary. The additional information and commentary can similarly be associated with the user generated content via metadata. The metadata in this case would be user generated and user specific. The user can be provided the ability to highlight particular objects, scenery, and characters in order to associate the additional information and commentary.

The metadata is used by the first party platform 110, for example, when users wish to query for particular user generated content stored in the content database 160. For example, users can query for user generated content associated with a particular event. Furthermore, the metadata can be used to search within the user generated content. For example, users can query within the user generated content for all instances when a particular character appears.

Furthermore, the metadata can be used with the game state module 150 to replicate the game state associated with the user generated content on another user computing device 190 so that that user can experience the scene that was recently viewed. The game state module 150 can utilize the associated metadata with the user generated content being viewed by the user on their computing device 190. Presuming that the user has the corresponding video game, the user generated content can be used like a "save file" so that the user viewing the user generated content can use the related information to replicate the game state. In this way, if a first user records an event within a video game and uploads the record as user generated content in the content database 160, that user generated content can then be utilized by a second user on their computing device 190 to replay that same event.

Once user generated content has been viewed, other users may provide comments and/or ratings. These comments and/or ratings can be used to characterize a quality and popularity of the user generated content. The comments and/or ratings are associated as metadata as well with the user generated content.

User generated content can be maintained in the content database 160, in some situations, presuming the content maintains a pre-determined threshold rating. If the user generated content is above the threshold, the content can remain in the content database 160. If the user generated content is below the threshold, the user generated content may be removed from the content database 160 immediately or after a pre-determined amount of time unless the content rating returns above the pre-determined threshold. In situations where similar user generated content is consolidated, the highest rated content may be "featured" or be promoted as the "most popular" associated with a particular subject matter.

Figure 2:
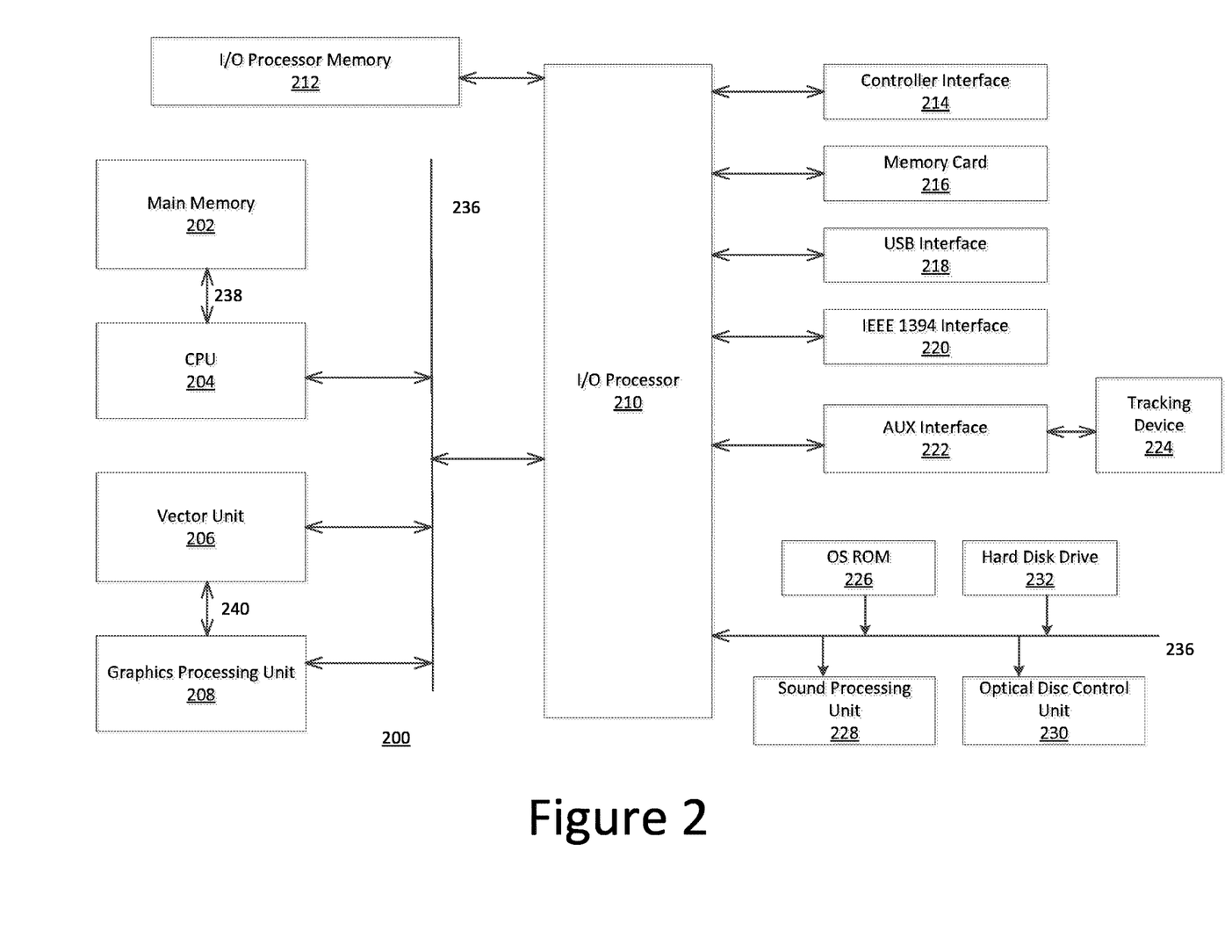
FIG. 2 illustrates an exemplary user computing device of FIG. 1.

FIG. 2 is an example user computing device 200 used in context of the system for scene tagging of FIG. 1. The computing device 200 (which in some cases may also include other types of computing devices such as desktops, laptops, tablets, gaming console, and mobile devices) is a device that the user can utilize to play various games associated with the first party platform of FIG. 1. Furthermore, the user computing device 200 allows the user to connect with the first party platform so that user generated content created at the user computing device 200 can be uploaded and stored for others to view.

The user computing device 200 may include various elements as illustrated in FIG. 2, however, it should be noted that the elements are exemplary and that other embodiments may incorporate more or less than the elements illustrated. With reference to FIG. 2, the user computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The computing device 200 further includes an operating system read-only memory (OS ROM) 226, a sound processing unit 228, an optical disc control unit 230, and a hard disc drive 232, which are connected via a bus 234 to the I/O processor 210. The user computing device 200 includes at least one tracking device 224.

The tracking device 224 may be a camera, which includes eye-tracking capabilities. The camera may be integrated into or attached as a peripheral device to the user computing device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user computing device 200 that captures voice data. The microphone may conduct acoustic source localization and/or ambient noise suppression. The microphones may be usable to receive verbal instructions from the user to schedule, retrieve and display content on the computing device 200.

Alternatively, tracking device 224 may be the controller of the computing device 200. The controller may use a combination of built-in accelerometers and infrared detection to sense its position in 3D space when pointed at the LEDs in a sensor nearby, attached to, or integrated into the console of the entertainment system. This design allows users to control functionalities of the user computing device 200 with physical gestures as well as button-presses. The controller connects to the user computing device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user computing device 200 instead can be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user computing device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the user computing device 200 provides instructions via the controller interface 214 to the CPU 204. For example, the user may instruct the CPU 204 to store certain information on the memory card 216 or instruct the computing device 200 to perform some specified action. Example controllers associated with the controller interface 214 may include a touch-screen, keyboards and game controllers.

Other devices may be connected to the user computing device 200 via the USB interface 218, the IEEE 1394 interface 220, and the AUX interface 222. Specifically, a tracking device 224, including a camera or a sensor may be connected to the user computing device 200 via the AUX interface 222, while a controller may be connected via the USB interface 218.

Figure 3:
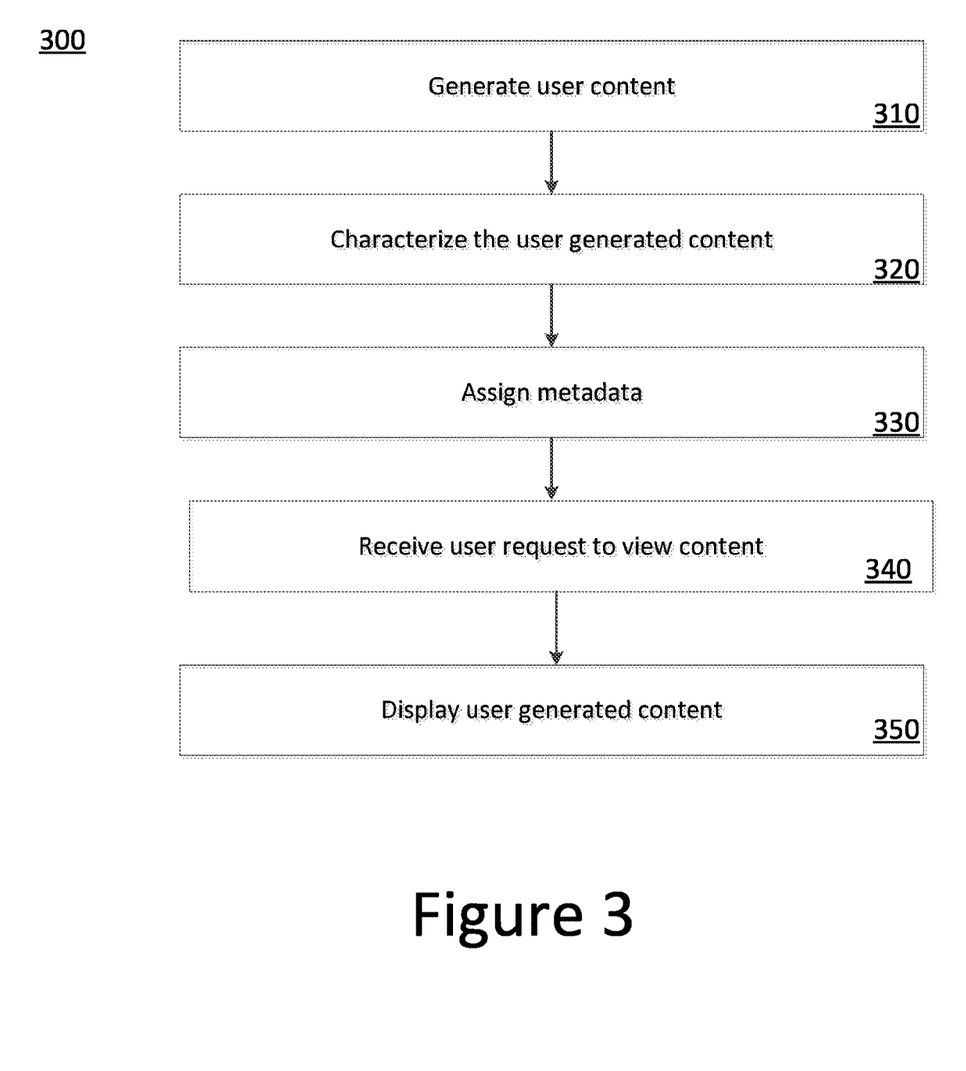
FIG. 3 is a method for scene tagging and using the scene tagging information.

FIG. 3 is a method 300 for scene tagging and using the scene tagging information. The method 300 allows users to tag user generated content. Based on the metadata used to tag the user generated content, other users are able to query for particular user generated content. Furthermore, the metadata used to tag the user generated content can be used to re-create the same game state so the other users are able to replicate the experience recorded in the user generated content.

The user, via the first party platform illustrated in FIG. 1, is capable (during course of playing a video game) of recording gameplay and/or taking screen shots in order to generate content. The user generated content is then tagged with metadata that is based, for example, on the particular scene (e.g. location within the video game), the objects within the scene, and characters within the scene. The metadata can also associate game state information such as identifying a particular event the user is currently participating in.

The user generated content (along with the associated metadata) is then stored in a database. Other users can query for and view the stored user generated content. The metadata allows for the user to query for particular aspects (e.g. an object, location, character) that can be found in the user generated content. Furthermore, the metadata also allows users to replicate the game state associated with the user generated content for their own play through.

In step 310, user content is generated at the first party platform. The user content may be generated via the first party platform through the use of various features that allow users to record what is currently happening within the video game as the user is participating in the video game. In other embodiments, the user may be capable of also recording what is currently happening within the video game using features associated with the user computing device. Such recording can include a snapshot of a location, object, or character. Recordings can be an extended video that includes audio covering the entirety of an event occurring within the video game.

For example, as the user is participating in a video game (e.g. race), the user may wish to record the user's performance within that race. The game may record exactly how the user navigated the course, the speed at which the user drove during the race, interactions with objects and other racers during the race, and other statistics used to characterize user performance.

In step 320, the user generated content is characterized by the first party platform. The characterization by the first party platform identifies the subject matter associated with the recording. By using game state information and machine vision, the first party platform may be capable of identifying what is exactly happening in the recording. Furthermore, similar user generated content can be identified.

In step 330, metadata is assigned to the user generated content. Metadata can be generated based on the characterization performed by the first party platform in step 320. The metadata would be used to describe what exactly is contained within the user generated content, for example, what object(s), location(s), or character(s) the user generated content pertains to. The metadata can also be generated based on specific user input whereby the user provides additional information or comments that the user would like to associate with the user generated content.

Once the metadata has been assigned to the user generated content, the content can be stored in a database. The metadata is useful in identifying similar user generated content that may already exist in the database. Similar or identical user generated content may be consolidated. In other instances, duplicate user generated content may be removed. How duplicate or similar user generated content is resolved may also take into consideration other user commentary or reviews/ratings.

In step 340, the first party platform receives user requests to view user generated content. Users may be provided a user interface associated with the first party platform that allows the user to query for user generated content in the content database. Such requests would be entered at the user computing devices and provided to the first party platform. If applicable user generated content correspond to terms associated with the query, the first party platform may provide such notification to the user.

If there is at least one user generated content that satisfies the user's query, the first party platform may provide a list of the related user generated content. The list may be organized any number of different ways. For example, the list of related user generated content based on the user query may be listed according to highest rating/popularity, most relevant to the query terms, or applicable to the videogame(s) the user has or is currently playing. Users may then select one or more user generated content to view on their user computing devices. If the user selects more than one, the selected user generated content may be saved in a queue to be played sequentially in turn as soon as the current content is completed.

In step 350, the user generated content is retrieved and displayed for the user to view on their computing device. The user computing device may have applications and/or software that is specifically compatible to process and display the user generated content. In some situations, the user computing device may use applications and/or software stored in the cloud/Internet in order to have the user generated content viewable on the user computing device. It may also be possible to render the user generated content within the same video game (presuming that the user has the same video game that the user generated content corresponds to). Since the user generated content has metadata that includes game state information, the video game assets stored in the first party platform and/or available on the user computing may be used to replicate the user generated content within the video game for the user to view.

Replication of the user generated content using video game assets found on the user computing device may resemble providing a "ghost" that mimics the exact movements of the creator of the user generated content. This would allow the user to simulate a race against the "ghost" and compare how the user would have done against the creator of the user generated content.

However, this simulation where the user could race the "ghost" of the creator would not be the exact same experience that the creator of the user generated content experienced. For example, the opponents and the skill of those opponents may be different. Thus the metadata can be used to recreate the game state within the video game that the creator experienced. In this way, the user would be able to directly experience the same race that the creator participated in.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for scene tagging, the method comprising:
generating a recording of a video game during gameplay, the generated recording including an in-game event that occurred during the gameplay of the video game;
identifying one or more details about the in-game event based on a machine vision analysis of the generated recording, the one or more details identified by the machine vision analysis including an in-game location where the in game event occurred and a game state of the in-game event;
generating metadata for association with the generated recording, wherein the metadata characterizes the in-game event based on the one or more details identified by the machine vision analysis;
grouping the generated recording with another generated recording having similar metadata;
storing the generated recording and the metadata in a database, wherein the grouping prevents further similar recordings from being stored in the database;
receiving a request from a user device of a requesting user regarding access to the generated recording stored in the database, the user request including one or more terms that correspond to the metadata; and
recreating at least part of the in-game event in accordance with the metadata responsive to the request, wherein recreating the in-game event includes skipping a portion of the video game to find the in-game event, and wherein gameplay by the requesting user is based on the game state of the recreated in-game event.

2. The method of claim 1, further comprising obtaining information regarding one or more in-game statistics associated with the game state when the in-game event was recorded, wherein the metadata further characterizes the in-game event based on the one or more in-game statistics.

3. The method of claim 1, wherein the generated recording includes a snapshot of a scene corresponding to the in game event.

4. The method of claim 1, wherein the one or more details include one or more objects present at the in-game location of the in-game event.

5. The method of claim 1, wherein the one or more details include one or more characters present at the in-game location of the in-game event.

6. The method of claim 1, further comprising obtaining user input that describes the in-game event, wherein the metadata further characterizes the in-game event based on the user input.

7. The method of claim 1, further comprising obtaining user rating and commentary about the in-game event, wherein the metadata further characterizes the in-game event based on the user rating and commentary.

8. The method of claim 7, further comprising generating a recommendation based on at least the user rating for the in-game event, wherein the received request includes a selection of the in-game event from among a plurality of other available recordings.

9. The method of claim 7, further comprising removing the generated recording from the database based on the user rating falling below a pre-determined threshold.

10. The method of claim 9, further comprising allowing a recording similar to the at least one generated recording to be stored in the database after removal of the at least one generated recording.

11. A system for scene tagging, the system comprising:
a first party platform that:
generates a recording of a video game during gameplay, the generated recording including an in-game event that occurred during the gameplay of the video game,
identifies one or more details about the in-game event based on a machine vision analysis of the generated recording, the one or more details identified by the machine vision analysis including an in-game location where the in-game event occurred and a game state of the in-game event,
generates metadata for association with the generated recording, wherein the metadata characterizes the in-game event based on the one or more details identified by the machine vision analysis,
groups the generated recording with another generated recording having similar metadata, and
stores the generated recording and the metadata in a database, wherein the grouping prevents further similar recordings from being stored in the database, and
receives a request from a user device of a requesting user regarding access to the generated recording stored in the database, the user request including one or more terms that correspond to the metadata, and
recreates at least part of the in-game event in accordance with the metadata responsive to the request, wherein recreating the in-game event includes skipping a portion of the video game to find the in-game event, and wherein gameplay by the requesting user is based on the game state of the recreated in-game event.

12. The system of claim 11, further comprising obtaining information regarding one or more in-game statistics associated with the game state when the recorded in-game event was recorded, wherein the metadata further characterizes the in-game event based on the one or more in-game statistics.

13. The system of claim 11, wherein the generated recording includes a snapshot of a scene corresponding to the in-game event.

14. The system of claim 11, wherein the one or more details include one or more objects present at the in-game location of the in-game event.

15. The system of claim 11, wherein the one or more details include one or more characters present at the in-game location of the in-game event.

16. The system of claim 11, wherein the first party platform further obtains user input that describes the in-game event, wherein the metadata further characterizes the in-game event based on the user input.

17. The system of claim 11, wherein the first party platform further obtains a user rating and commentary about the in-game event, wherein the metadata further characterizes the in-game event based on the user rating and commentary.

18. The system of claim 17, wherein the first party platform generates a recommendation based on at least the user rating for the in-game event, wherein the received request includes a selection of the in game event from among a plurality of other available recordings.

19. The system of claim 17, wherein the first party platform further removes the generated recording from the database based on the user rating falling below a pre-determined threshold.

20. The system of claim 19, wherein the first party platform further allows a recording similar to the at least one generated recording to be stored in the database after removal of the at least one generated recording.

21. A non-transitory, computer-readable storage medium, having embodied thereon a program executable by a processor to perform a method for scene tagging, the method comprising:
generating a recording of a video game during gameplay, the generated recording including an in-game event that occurred during the gameplay of the video game;
identifying one or more details about the in-game event based on a machine vision analysis of the generated recording, the one or more details identified by the machine vision analysis including an in-game location where the in-game event occurred and a game state of the in-game event;
generating metadata for association with the generated recording, wherein the metadata characterizes the in-game event based on the one or more details identified by the machine vision analysis;
grouping the generated recording with another generated recording having similar metadata;
storing the generated recording and the metadata in a database, wherein the grouping prevents further similar recordings from being stored in the database;
receiving a request from a user device of a requesting user regarding access to the generated recording stored in the database, the user request including one or more terms that correspond to the metadata; and
recreating at least part of the in-game event in accordance with the metadata responsive to the request, wherein recreating the in-game event includes skipping a portion of the video game to find the in-game event, and wherein gameplay by the requesting user is based on the game state of the recreated in-game event.

* * * * *